United States Patent
Dagli et al.

(10) Patent No.: US 10,459,934 B2
(45) Date of Patent: *Oct. 29, 2019

(54) RE-SIZING DATA PARTITIONS FOR ENSEMBLE MODELS IN A MAPREDUCE FRAMEWORK

(71) Applicant: International Business Machines Corporation, Armonk, NY (US)

(72) Inventors: C. Ates Dagli, River Forest, IL (US); Niall Fraser McCarroll, Wokingham (GB); Dmitry Vasilenko, Buffalo Grove, IL (US)

(73) Assignee: International Business Machines Corporation, Armonk, NY (US)

( * ) Notice: Subject to any disclaimer, the term of this patent is extended or adjusted under 35 U.S.C. 154(b) by 1130 days.

This patent is subject to a terminal disclaimer.

(21) Appl. No.: 14/630,379

(22) Filed: Feb. 24, 2015

(65) Prior Publication Data

US 2015/0356149 A1 Dec. 10, 2015

Related U.S. Application Data

(63) Continuation of application No. 14/297,606, filed on Jun. 5, 2014, now Pat. No. 9,798,782.

(51) Int. Cl.
*G06F 16/2458* (2019.01)
*G06F 16/21* (2019.01)
*G06F 16/28* (2019.01)

(52) U.S. Cl.
CPC ........ *G06F 16/2465* (2019.01); *G06F 16/212* (2019.01); *G06F 16/289* (2019.01); *G06F 2216/03* (2013.01)

(58) Field of Classification Search
CPC ......... G06F 17/30539; G06F 17/30294; G06F 17/30607; G06F 16/2465; G06F 16/289; G06F 16/212; G06F 2216/03
(Continued)

(56) References Cited

U.S. PATENT DOCUMENTS 6,366,945 B1 4/2002 Fong et al.
6,609,187 B1 8/2003 Merrell et al.
(Continued)

OTHER PUBLICATIONS

Response to Final Office Action dated Dec. 15, 2016, filed Mar. 15, 2017 13 pgs.
(Continued)

*Primary Examiner* — Hosain T Alam
*Assistant Examiner* — Saba Ahmed
(74) *Attorney, Agent, or Firm* — Shumaker & Sieffert, P.A.

(57) ABSTRACT

Techniques are described for revising data partition size for use in generating predictive models. In one example, a method includes determining an initial number of base model partitions of data from a plurality of data sources; determining an initial base model partition size based at least in part on the initial number of base model partitions; and evaluating the initial base model partition size at least in part with reference to at least one base model partition size reference. The method further includes determining a finalized number of base model partitions based at least in part on the initial base model partition size; determining a revised base model partition size; and generating revised base models based at least in part on the revised base model partition size, including using a predictive modeling framework to randomly assign input data records from the plurality of data sources into the base model partitions.

11 Claims, 8 Drawing Sheets

(58) Field of Classification Search
USPC .......................................................... 707/792
See application file for complete search history.

(56) References Cited

U.S. PATENT DOCUMENTS

| | | | |
|---|---|---|---|
| 7,627,432 B2 | 12/2009 | Wilkinson | |
| 8,533,222 B2 | 9/2013 | Breckenridge et al. | |
| 8,583,687 B1* | 11/2013 | Piedmonte | G06F 17/30584 |
| | | | 707/736 |
| 2003/0023826 A1 | 1/2003 | McMichael et al. | |
| 2007/0174290 A1* | 7/2007 | Narang | G06F 17/30539 |
| 2008/0114870 A1 | 5/2008 | Pu | |
| 2009/0125700 A1 | 5/2009 | Kisel | |
| 2011/0061057 A1 | 3/2011 | Harris et al. | |
| 2011/0071956 A1 | 3/2011 | Pinto et al. | |
| 2011/0138148 A1 | 6/2011 | Friedman et al. | |
| 2011/0302164 A1* | 12/2011 | Krishnamurthy | |
| | | | G06F 17/30516 |
| | | | 707/737 |
| 2012/0131591 A1* | 5/2012 | Moorthi | G06Q 10/06 |
| | | | 718/104 |
| 2012/0239613 A1 | 9/2012 | Danciu et al. | |
| 2012/0311589 A1 | 12/2012 | Agarwal et al. | |
| 2013/0254196 A1 | 9/2013 | Babu et al. | |

OTHER PUBLICATIONS

Office Action from U.S. Appl. No. 14/297,606, dated Jun. 13, 2016, 20 pp.
Notice of Allowance from U.S. Appl. No. 14/297,606, dated Jun. 7, 2017, 21 pp.
U.S. Appl. No. 14/297,606, by Ates C. Dagli, filed Jun. 5, 2014.
"List of IBM Patents or Patent Applications Treated as Related," Appendix P, 2 pp.
Final Office Action from U.S. Appl. No. 14/297,606, dated Dec. 15, 2016, 25 pp.
Response to the Office Action dated Jun. 13, 2016, from U.S. Appl. No. 14/297,606, filed Sep. 12, 2016, 11 pp.
Advisory Action from U.S. Appl. No. 14/297,606, dated Apr. 5, 2017, 3 pp.

* cited by examiner

RE-SIZING DATA PARTITIONS FOR ENSEMBLE MODELS IN A MAPREDUCE FRAMEWORK

This application is a continuation of U.S. application Ser. No. 14/297,606, filed on Jun. 5, 2014 entitled RE-SIZING DATA PARTITIONS FOR ENSEMBLE MODELS IN A MAPREDUCE FRAMEWORK, the entire content of which is incorporated herein by reference.

TECHNICAL FIELD

This disclosure relates to processing data, and more particularly, to techniques for data mining.

BACKGROUND

Data mining may be used to extract useful information from large volumes of data. Extracting the useful information may include processing the large volumes of data, identifying significant and/or meaningful patterns in the data, and presenting the identified patterns as knowledge for achieving the goals of a user. For a data mining application to be widely applicable, a user should be able to supply the data mining application with data specific to a problem domain, without having to provide the data mining application with details of the problem domain. The data mining application may then identify patterns with respect to the supplied data.

SUMMARY

In general, examples disclosed herein are directed to techniques for revising data partition size for use in generating predictive models, and as further described below.

In one example, a method includes determining an initial number of base model partitions of data from a plurality of data sources; determining an initial base model partition size based at least in part on the initial number of base model partitions; and evaluating the initial base model partition size at least in part with reference to at least one base model partition size reference. The method further includes determining a finalized number of base model partitions based at least in part on the initial base model partition size; determining a revised base model partition size; and generating revised base models based at least in part on the revised base model partition size, wherein generating the revised base models comprises using a predictive modeling framework to randomly assign input data records from the plurality of data sources into the finalized number of base model partitions.

In another example, a computer system for revising data partition size for use in generating predictive models includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to determine an initial number of base model partitions of data from a plurality of data sources. The computer system further includes program instructions, stored on at least one of the one or more storage devices for execution by at least one of the one or more processors via at least one of the one or more memories, to determine an initial base model partition size based at least in part on the initial number of base model partitions. The computer system further includes program instructions, stored on at least one of the one or more storage devices for execution by at least one of the one or more processors via at least one of the one or more memories, to evaluate the initial base model partition size at least in part with reference to at least one base model partition size reference. The computer system further includes program instructions, stored on at least one of the one or more storage devices for execution by at least one of the one or more processors via at least one of the one or more memories, to determine a finalized number of base model partitions based at least in part on the initial base model partition size. The computer system further includes program instructions, stored on at least one of the one or more storage devices for execution by at least one of the one or more processors via at least one of the one or more memories, to determine a revised base model partition size. The computer system further includes program instructions, stored on at least one of the one or more storage devices for execution by at least one of the one or more processors via at least one of the one or more memories, to generate revised base models based at least in part on the revised base model partition size, wherein generating the revised base models comprises using a predictive modeling framework to randomly assign input data records from the plurality of data sources into the finalized number of base model partitions.

In another example, a computer program product for revising data partition size for use in generating predictive models includes a computer-readable storage medium having program code embodied therewith. The program code is executable by a computing device to determine an initial number of base model partitions of data from a plurality of data sources. The program code is further executable by a computing device to determine an initial base model partition size based at least in part on the initial number of base model partitions. The program code is further executable by a computing device to evaluate the initial base model partition size at least in part with reference to at least one base model partition size reference. The program code is further executable by a computing device to determine a finalized number of base model partitions based at least in part on the initial base model partition size. The program code is further executable by a computing device to determine a revised base model partition size. The program code is further executable by a computing device to generate revised base models based at least in part on the revised base model partition size, wherein generating the revised base models comprises using a predictive modeling framework to randomly assign input data records from the plurality of data sources into the finalized number of base model partitions.

The details of one or more embodiments of this disclosure are set forth in the accompanying drawings and the description below. Other features, objects, and advantages of this disclosure will be apparent from the description and drawings, and from the claims.

DETAILED DESCRIPTION

Various examples are disclosed herein for evaluating and revising data partition size for use in generating predictive models from multiple data sources. Predictive modeling may refer to an area of data mining and knowledge discovery directed toward extracting and providing data patterns having predictive value from the input data. For example, predictive modeling may be used in marketing to improve return on marketing investment by ranking consumers according to their predicted response to promotional materials and providing the promotional materials only to those consumers deemed most likely to respond and generate revenue. Predictive modeling may also be used in the credit industry to determine a probability that a consumer or business will default on a loan of a specified size, based information known about the consumer or business. The predictive models may then be used in deciding whether to grant loans and/or determining maximum loan amounts.

Predictive modeling may also be used in the insurance industry to determine a frequency with which a consumer or business will file insurance claims and/or an average loss amount per claim. The predictive models may then be used to set insurance premiums and/or to set underwriting rules for different categories of insurance coverage. Predictive modeling may also be used in Internet advertising to determine a probability that a user will click through an advertisement, based on information known about the user and the content in the advertisement. The predictive models may then be used to select an advertisement to serve to each user, to improve click-through rates and/or revenue. The above applications of predictive modeling are merely exemplary and are not intended to be limiting of the disclosure, and other applications of predictive modeling are broadly contemplated within the scope of implementations of this disclosure. Examples of predictive modeling system implementations of this disclosure are further described below with reference to the figures.

Figure 1:
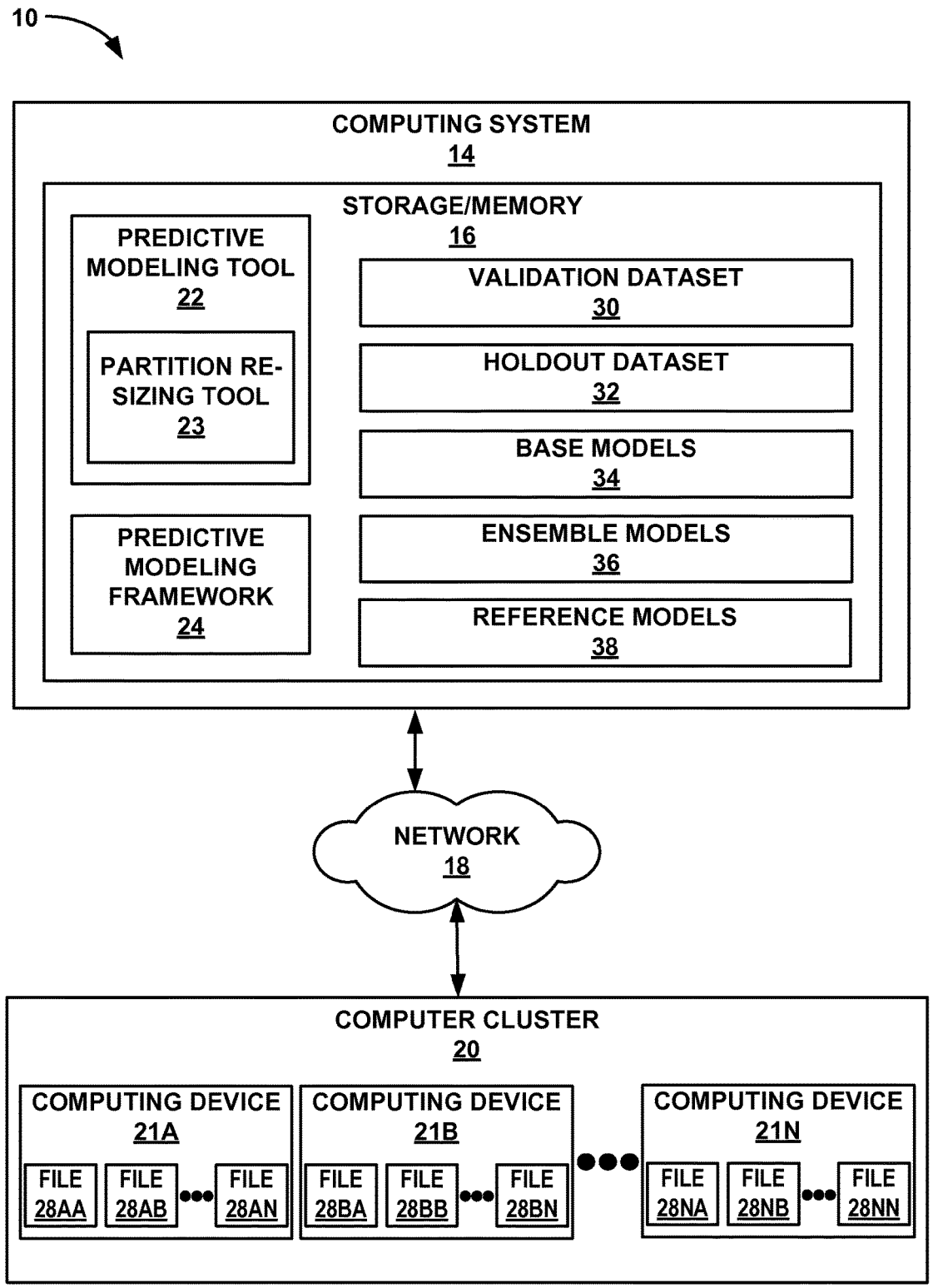
FIG. 1 is a block diagram illustrating an example computing environment in which a computing system may process data with a computer cluster, in accordance with one example.

FIG. 1 is a block diagram illustrating an example computing environment 10 in which a computing system 14 may process data with a computer cluster 20, in accordance with one example. Computing system 14 may include one or more memory components and/or one or more data storage devices, collectively storage/memory 16, which may have executable instructions, data, etc. stored and/or executing thereon. Computing system 14 may be coupled via a network 18 to a computer cluster 20, which may include a large number or any number of computing devices 21A-21N (collectively, "computing devices 21" or equivalently "compute nodes 21"). Computer cluster 20 may include any number of computing devices of any kind, which may be implemented in a single facility or be widely dispersed in two or more separate data centers or other facilities anywhere in the world, in different examples.

One embodiment of this disclosure may provide a predictive modeling tool 22 (e.g., a predictive modeling application) stored and/or executing on computing system 14 (or on storage/memory 16 thereof) and configured to generate predictive models from multiple data sources. To this end, predictive modeling tool 22 may make one or more calls to an application programming interface (API) supported by an underlying predictive modeling framework 24 (e.g., a MapReduce framework). Predictive modeling framework 24 may be configured to support distributed computing on very large amounts of data using computer cluster 20 including computing devices 21, which may be considered compute nodes of computer cluster 20.

In some embodiments, the data processed and/or stored by computing devices 21 may be organized in files. Each of computing devices 21 may at least temporarily or transiently contain, in its memory and/or data storage, one or more files 28AA-28NN (collectively, "files 28"), e.g., computing device 21A contains files 28AA-28AN, computing device 21B contains files 28BA-28BN, etc. to computing device 21N which may contains files 28NA-28NN. Each of files 28 may include any type set, collection, or arrangement of data. Data may be accessed from any number of data sources, which may or may not be related to each other. The data may include data records that may be organized in input sources that may be organized in any type of arrangement in files, blocks, partitions, and/or other groupings. One of computing devices 21 may "contain" one of files 28 in the sense that the data corresponding to a particular file 28 is at least temporarily or transiently stored on, encoded on, or being processed by at least one data storage device, memory device, cache, register, or other data encoding component, device, or medium of computing device 21.

In some embodiments, the data may amount to petabytes of data and the cluster may include thousands of compute nodes 21. To facilitate distributed computing, predictive modeling framework 24 may schedule operations to be performed by compute nodes 21, monitor compute nodes 21 and/or the operations compute nodes 21 are performing, and reschedule failed operations to be re-performed by the compute nodes 21. The operations to be performed by the compute nodes 21 may include map operations and/or reduce operations associated with a MapReduce framework, as further described below, and which may be implemented at least in part in the form of predictive modeling framework 24.

Predictive modeling tool 22 may make an API call to predictive modeling framework 24, to provide implementations of one or more map operations and/or one or more reduce operations. The implementations may be provided using object-oriented techniques, such as by implementing interfaces and/or abstract classes supported by the predictive modeling framework 24. By providing implementations of the map operations and reduce operations, predictive modeling tool 22 may configure predictive modeling framework 24 to suit the needs of predictive modeling tool 22. Predictive modeling tool 22 may also make additional API calls to predictive modeling framework 24, to specify locations, addresses, or destinations of desired input data sets and output data sets, respectively.

As described in this disclosure, predictive modeling tool 22 and/or partition re-sizing tool 23 may be implemented as an application, a framework, a module, a library, any collection of executable instructions, or a system or device with any such collection of executable instructions stored or executing thereon, for example. Computing devices 21 may include thousands, millions, or any number of computing devices of any type, and may include a widely heterogeneous and/or widely geographically dispersed collection of devices. Computing devices 21 may include desktop computers, laptop computers, servers, commodity cluster nodes, mainframe hardware, or any type of device.

Network 18 may represent any communication network, and may include a packet-based digital network such as a private enterprise intranet or a public network like the Internet. In this manner, computing environment 10 can readily scale to suit large enterprises. Users may directly access computing system 14 and/or computing cluster 20 via a local area network or remotely via a virtual private network, remote dial-up, or similar remote access communication mechanism.

For exemplary purposes, various examples of the techniques of this disclosure may be readily applied to various computing systems, including enterprise database server systems or other large-scale enterprise software systems. Examples of enterprise database server systems include enterprise financial or budget planning systems, order management systems, inventory management systems, sales force management systems, banking or financial management systems, database server tools, project and resource management systems, and other enterprise software systems.

As described above, in one embodiment, predictive modeling tool 22 may be configured to generate predictive models from multiple data sources. However, depending on the embodiment, some or all of the functionality of predictive modeling tool 22 may be performed, executed, supported, or embodied by predictive modeling framework 24. Various example implementations of this disclosure may be considered to be performed and/or embodied by predictive modeling tool 22, predictive modeling framework 24, partition re-sizing tool 23, computing system 14, a device comprised in computing system 14, or other associated system. Further, any predictive modeling or mapping/reducing framework may be used according to or in support of techniques of this disclosure, including application frameworks implementing the MapReduce interface, such as the Hadoop® framework available from the Apache Software Foundation, for example.

In one embodiment, once predictive modeling framework 24 is configured, predictive modeling framework 24 may split or partition the input data set into multiple subsets, partitions, or samples, to be processed in parallel on cluster 20 of compute nodes 21, with a potentially very high degree of parallel processing. To this end, each compute node 21 may execute one or more map operations in parallel on a respective subset of the input data, to create a subset, partition, or sample of intermediate data. Predictive modeling framework 24 may then provide intermediate data as input to one or more reduce operations, which may be executed by each of one or more compute nodes 21. Cluster 20 may perform one or more reduce operations on the intermediate data and may thereby generate an output data set, which cluster 20, predictive modeling tool 22, and/or predictive modeling framework 24 may store in one or more desired locations as may be specified by predictive modeling tool 22 during the configuration process.

In some embodiments, a user may only desire a map operation to be performed. In such embodiments, predictive modeling tool 22 may not necessarily provide an implementation of a reduce operation to predictive modeling framework 24. Accordingly, in such embodiments, the intermediate data generated by a map operation may be regarded as a final output and may be stored in a desired location as specified by predictive modeling tool 22.

In one embodiment, a map operation may output intermediate data in a format of multiple pairs of data, each pair including a key and an associated value. Further, a reduce operation may accept, as input, data in the format of the multiple pairs of data.

The output of the reduce operation may also be in the format of the multiple pairs of data. In one example of a format of multiple pairs of data by the map operation and/or reduce operation, a user may require generating a count of each word in the English language that appears in a plurality of documents. In this particular example, the format of multiple pairs of data may represent a count of occurrences of each English word across the documents. Each key stores an English word and each value stores a corresponding count of occurrences of the English word as determined by the map operation and/or reduce operation. Predictive modeling framework 24 may schedule each compute node 21 to perform a map operation on a respective document. The intermediate data generated by the map operation may represent the occurrences of each word in the respective document. Predictive modeling framework 24 may then schedule each compute node 21 to perform a reduce operation, which tallies the occurrences across all of the documents to generate the output data set. Although the above example is described with reference to a plurality of documents as input data to the map operation, in other embodiments, the input data to the map operation may also be formatted as multiple pairs of data, each pair including a key and an associated value.

As described above, in one embodiment, predictive modeling tool 22 may generate predictive models from multiple data sources in a distributed computing environment 10. To this end, predictive modeling tool 22 may use predictive modeling framework 24 executing in the distributed computing environment 10. Additionally or alternatively, predictive modeling tool 22 may also adhere to a predefined architecture for generating predictive models. In some embodiments, the architecture for generating predictive models may facilitate generating predictive models from various types of data sets. The types of data sets may include a first type representing a single data source to be processed in a single pass to generate a single predictive model. The types of data sets may also include a second type representing real-time data streams to be processed to generate a predictive model. The types of data sets may also include a third type representing distributed data sources. In some embodiments, the distributed data sources may include a plurality of predictive models to be combined to generate a single predictive model, without accessing any data set from which the plurality of predictive models is generated. Depending on the embodiment, some or all of the functionality of predictive modeling tool 22 adhering to the predefined architecture may be performed by the underlying predictive modeling framework 24.

In one embodiment, to generate predictive models from multiple data sources in distributed computing environment 10, predictive modeling tool 22 may implement a map operation configured to generate a base model for each data source. The map operation may also be configured to extract a validation sample and a holdout sample from the respective data source. In some embodiments, predictive modeling tool 22 may extract the validation sample and the holdout sample randomly from the respective data source. In some embodiments, predictive modeling tool 22 may extract the validation sample and the holdout sample with a predetermined size, in terms of the number of data records from the data source allotted to each of the validation sample and the holdout sample.

Predictive modeling tool 22 may also implement a reduce operation that is configured to generate reduced base models from the training samples or base models, and to generate a reference model from the validation dataset. Predictive modeling tool 22 may also implement a reduce operation to generate an ensemble model based the reduced base models. Predictive modeling tool 22 may also perform an evaluation of the ensemble model and the reference model with reference to the holdout dataset.

Initial divisions or assignments of data to base models may generate base models of uneven partition sizes or a difficult-to-process range of partition sizes that may interfere with later processing and predictive modeling. However, predictive modeling tool 22 may be enabled to determine a revised base model partition size, and to generate revised base models based at least in part on the revised base model partition size. Predictive modeling tool 22 may further be enabled to generate an output based at least in part on the revised base model partition size.

Functionality for determine a revised base model partition size, and to generate revised base models based at least in part on the revised base model partition size may, in some examples, be implemented at least in part in a dedicated partition re-sizing tool 23. Partition re-sizing tool 23 may take the form of one or more modules, libraries, utilities, tools, or other collections of executable instructions and/or memory, storage, processors, and/or other hardware configured for executing, performing, or embodying the functionality described herein. Partition re-sizing tool 23 may take the form of a software upgrade to a pre-existing predictive modeling tool 22, or as an initially integrated part of predictive modeling tool 22, in different examples.

In one example, predictive modeling tool 22 may employ distributed ensemble model-building algorithms in which one base model (or reduced base model) may be built from each of a number of data partitions (or data samples split from the input data, or base model partitions) and evaluated against a sample set aside for this purpose, e.g., a holdout sample. Predictive modeling tool 22 may then select the best-performing base models and combine them into a model ensemble for purposes of predictive modeling. Both model-building performance and the statistical validity of the models may depend on data records being distributed approximately randomly across at least roughly equal-sized base model partitions. Better or closer equality of partition size and better randomness may improve the quality of the predictive modeling resulting from the processed data.

When implemented in a MapReduce framework such as predictive modeling framework 24, predictive modeling tool 22 may build base models in mappers. Sizes of partitions and the distribution of data records among the partitions are initially properties of the input data source. The partition size of the input source may often be uneven and rarely of appropriate size for building models. Furthermore, data records are frequently arranged in some systematic order and not randomly ordered. As a result, base models sometimes fail to build or, what is worse, produce incorrect or suboptimal results. The simplest example of uneven partition sizes is one caused by the fact that the last block of a file is almost always a different size from those before it.

Figure 2:
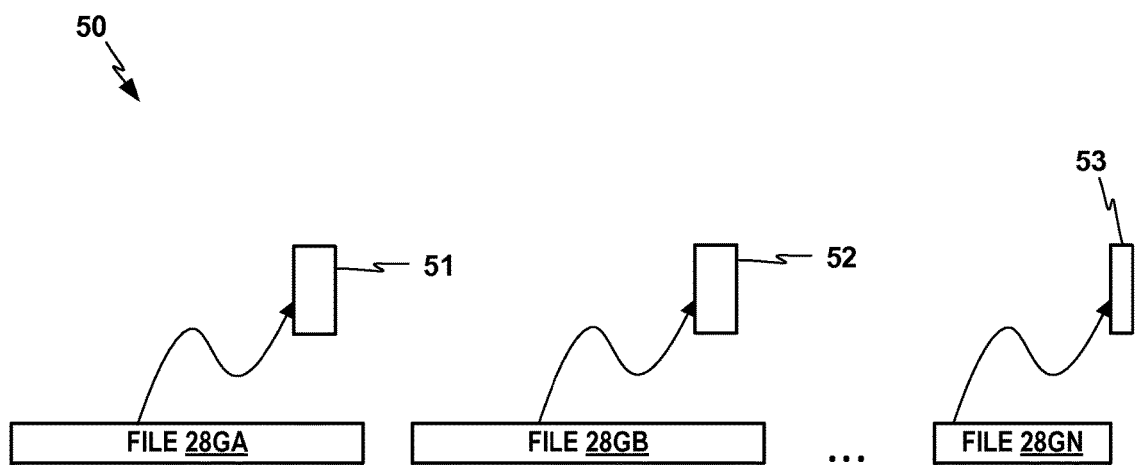
FIG. 2 shows a conceptual diagram of an example process in which data records are assigned by a predictive modeling framework and/or predictive modeling tool from files from an input data source, to initial base mode partitions respectively.

FIG. 2 shows a conceptual diagram of an example process 50 in which data records are assigned by a predictive modeling framework 24 and/or predictive modeling tool 22 from files 28GA, 28GB, ... 28GN from an input data source, to initial base mode partitions 51, 52, 53, respectively. For purposes of this disclosure, a data partition may be an independent non-overlapping chunk of data. In this example, the last block or initial base model 53 is built from a smaller number of data records, e.g., a remainder of data records at the end of a processing block, or from a file 28GN that happens to be smaller than the preceding files. Predictive modeling framework 24 may resolve disadvantages of this heterogeneous base model partitioning by determining a revised partition size for initial base models 51, 52, 53, as further described below.

Figure 3:
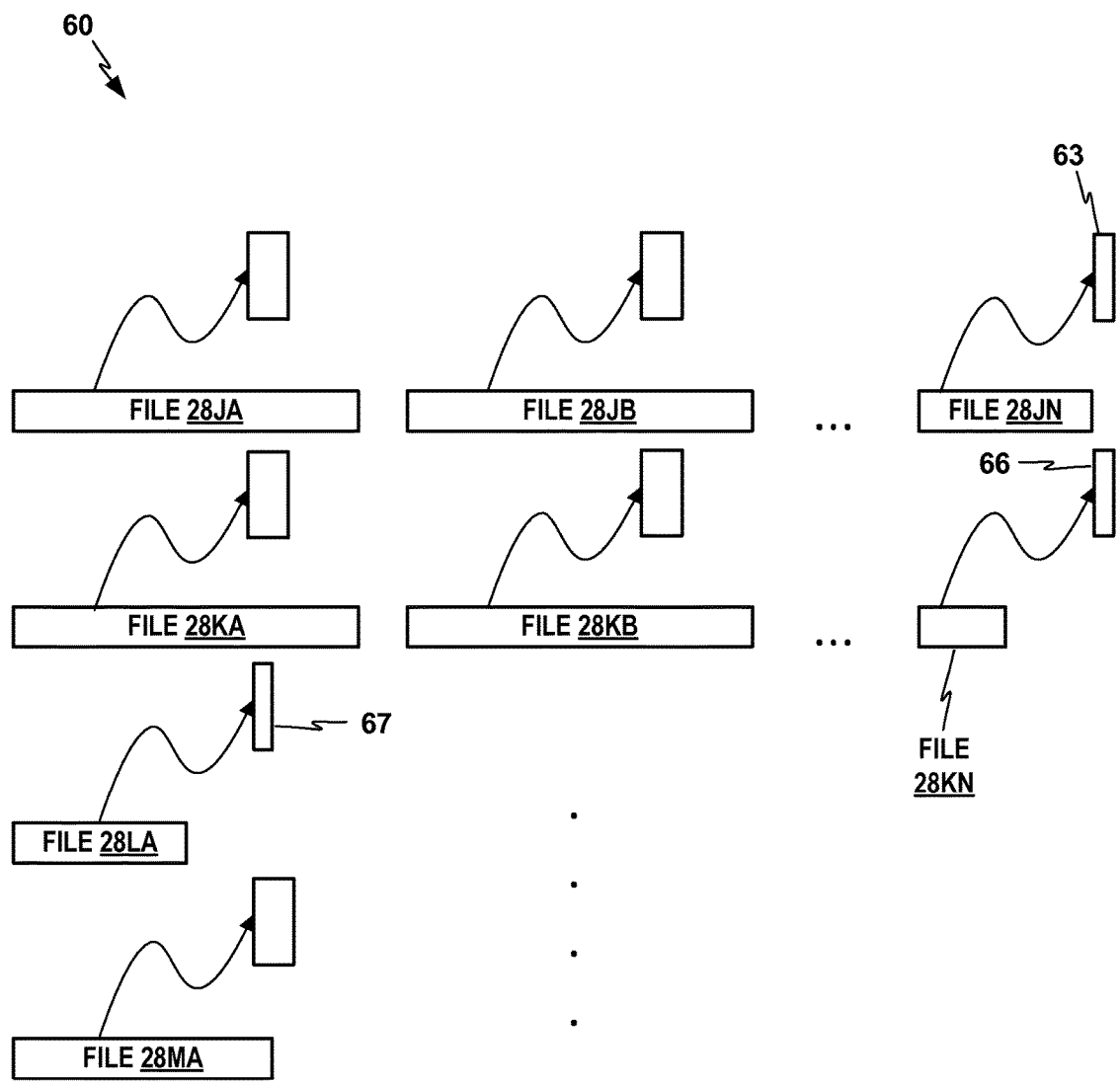
FIG. 3 shows another conceptual diagram of an example process in which data records are assigned by a predictive modeling framework and/or predictive modeling tool from files from an input data source, to respective initial base models.

FIG. 3 shows another conceptual diagram of an example process 60 in which data records are assigned by a predictive modeling framework 24 and/or predictive modeling tool 22 from files 28JA, 28JB, ... 28JN, 28KA, 28KB, ... 28KN, ... 28LA, ... 28MA, etc. from an input data source, to respective initial base models. In this example, When the dataset is comprised of a large number of files, as may often be the case, the number of small base model partitions increases, as with example initial base model partitions 63, 66, 67, which all have significantly smaller partition sizes than many of the other initial base model partitions. As with the example above, predictive modeling framework 24 may resolve disadvantages of this heterogeneous base model partitioning by determining a revised partition size for initial base models 63, 66, 67, as further described below.

Figure 4:
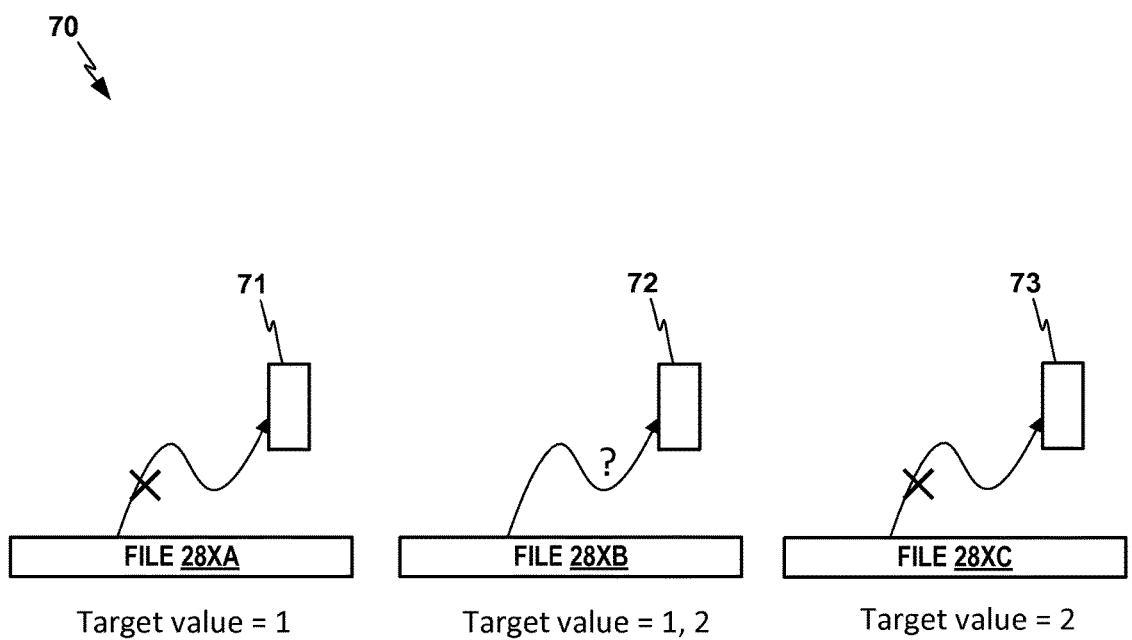
FIG. 4 shows a conceptual diagram of an example process in which data records are assigned by a predictive modeling framework and/or predictive modeling tool from files from an input data source, to initial base models respectively.

FIG. 4 shows a conceptual diagram of an example process 70 in which data records are assigned by a predictive modeling framework 24 and/or predictive modeling tool 22 from files 28XA, 28XB, 28XC from an input data source, to initial base models 71, 72, 73, respectively. Another assumption or set of advantageous conditions that may frequently be violated in initial processing is that the input records are randomly distributed among partitions. If the records in the dataset are ordered by the values of the modeling target field, an input field, or a field correlated with them, then predictive modeling framework 24 and/or predictive modeling tool 22 may not initially be able to build base models, or the base models may exhibit low predictive accuracy. In the example shown in FIG. 4, records are ordered by the binary-valued target. In a traditional process without using advantageous features of this disclosure, no model could be built from the first partition 71 or the last partition 73 because there is no variation in the target value. In a traditional process without using advantageous features of this disclosure, predictive modeling tool 22 might be able to build a model from the second partition 72, but its quality for facilitating useful results would depend on where the boundary between the two target values lies.

However, in examples of this disclosure, predictive modeling tool 22 may use techniques or methods to resolve the drawbacks described above. In examples of this disclosure, predictive modeling tool 22 may subject optimally-sized partitions of shuffled, or randomly ordered, data records to model-building steps using facilities built into predictive modeling framework 24. Predictive modeling tool 22 may run model-building steps in reducers operated by predictive modeling framework 24 with input base model partitions whose size may be configurable automatically, or in response to inputs, including user inputs. Predictive modeling tool 22 may randomly assign the contents of the base model partitions.

In various embodiments of this disclosure, predictive modeling tool 22 may allow the partition size to be set at runtime. The partition size may be based on statistical heuristic rules, properties of the modeling problem, properties of the computing environment, or any combination these factors. Each base model partition may include or consist of a set of data records selected with equal probability from the input, such as using MapReduce random assignment management capabilities of predictive modeling framework 24.

Predictive modeling tool 22 of this disclosure may provide various advantages. In some examples, predictive modeling tool 22 of this disclosure may provide or guarantee partitions of uniform optimal size. In some examples, predictive modeling tool 22 of this disclosure may advantageously employ built-in mechanisms of predictive modeling framework 24 for automatically grouping records passed to reducers, among other advantages.

In addition to partitions for building base models, ensemble modeling may require the creation of the validation and the holdout samples, as indicated above, as two small random samples of records. The sizes of these samples may be preset constants, as indicated above. Predictive modeling tool 22 may generate the reference model from the validation sample in order to compare with the ensemble, as further described below. In some examples, predictive modeling tool 22 may use the validation sample to rank the predictive performance of the base models in a later step. Also in a later step, predictive modeling tool 22 may use the holdout sample to compare the predictive performance of the ensemble with that of the reference model.

Predictive modeling tool 22 may determine the target number or desired number of models in the final ensemble, E, in accordance with a user input, or based on internal criteria. It may be in the range of 10-100. Predictive modeling tool 22 may, in some examples, use rules to determine how to partition the data to balance goals such as for an advantageous or desirable partition size with that of building an ensemble of the target or desired size.

Figure 5:
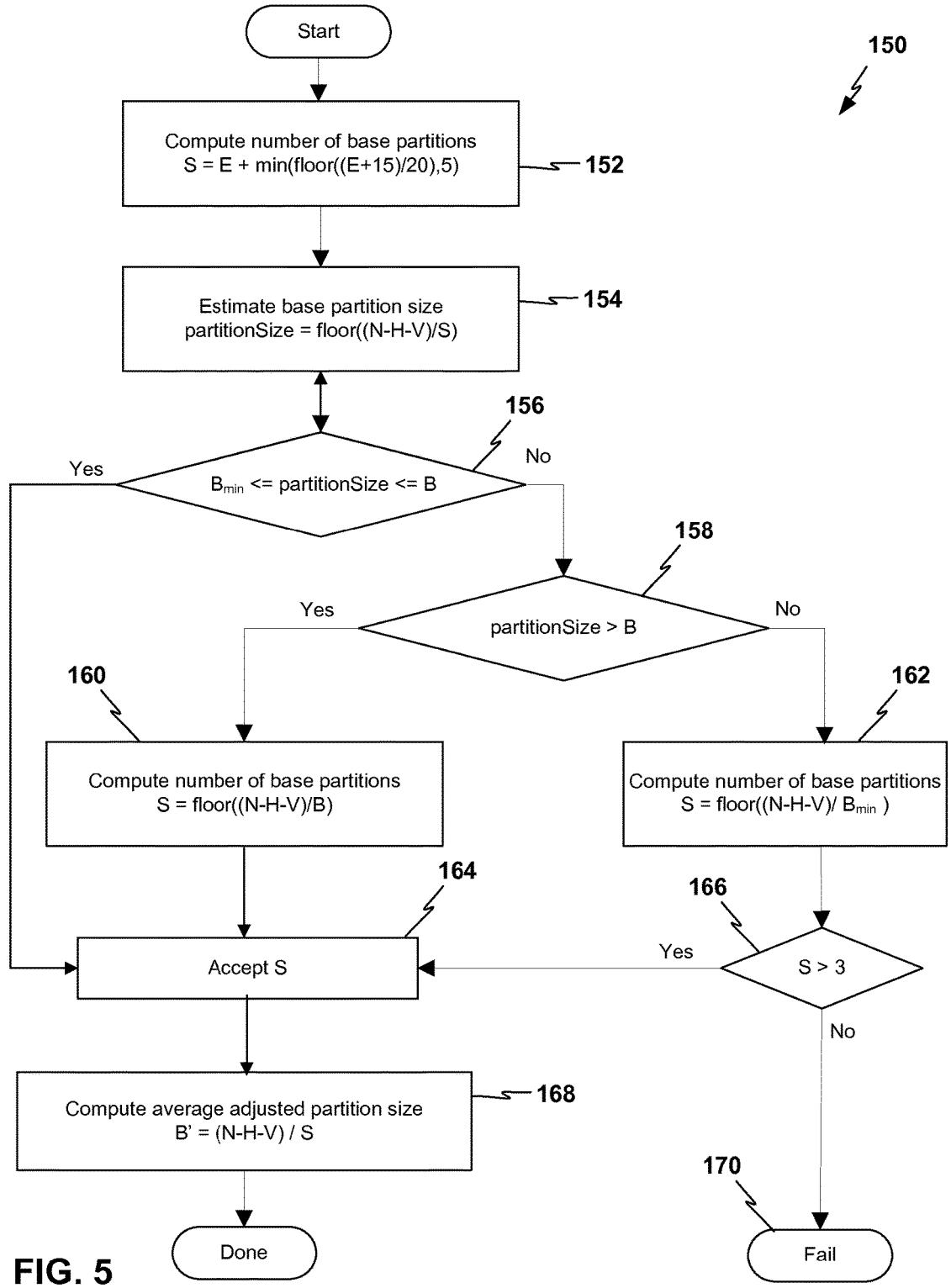
FIG. 5 depicts a flowchart for a process that an example predictive modeling tool of this disclosure may perform to determine a finalized number of base model partitions based at least in part on the initial base model partition size.

FIG. 5 depicts a flowchart for a process 150 that an example predictive modeling tool 22 of this disclosure may perform to determine a finalized number of base model partitions based at least in part on the initial base model partition size. The flowchart of FIG. 5 shows an example process 150 of an example predictive modeling tool 22 of this disclosure computing an average adjusted partition size. Predictive modeling tool 22 may select a target value or optimal value for the size of the base model partition, B. The target value for the size of the base model partition B may be based on one or more of statistical heuristic rules, properties of the modeling problem, properties of the computing environment, or any combination these factors. Predictive modeling tool 22 may also determine a minimum acceptable value for the size of the base model partition, $B_{min}$, which may be based on one or more of the same factors.

Given the total number of records in the input dataset N, the size of the holdout sample (H), and the size of the validation sample (V), predictive modeling tool 22 may determine the number of base models, S, as represented in pseudocode as follows, with references to flowchart reference callouts commented out Lisp-style (with semicolons):

Set S=E+min(floor((E+15)/20),5); (152)
Set partitionSize=floor((N−H−V)/S); (154)
If Bmin<=partitionSize<=B (156), accept S.; (164)
Else if partitionSize>B, compute; (158)
  S=floor((N−H−V)/B). Accept S.; (160, 164)
Else compute
  S=floor((N−H−V)/Bmin); (162)
If S>=3, accept S.; (166, 164)
Else there are too few records for this ensemble modeling technique to apply.; (170)

Predictive modeling tool 22 may use any form of algorithms, libraries, or other executable instructions or hardware elements as described herein to perform these example processes.

Given S, predictive modeling tool 22 may compute an average adjusted partition size, B' as:

$$B'=(N-H-V)/S.$$

B' may usually not be a whole number. Sampling probabilities for base partitions, the validation sample, and the holdout sample are B'/N, V/N, and H/N, respectively. Note that $$S*(B'/N)+V/N+H/N=N/N=1$$

so that the sampling probabilities add up to 1.

Therefore, predictive modeling tool 22 may perform a process such as the one described above to determine an initial number of base model partitions of data from a plurality of data sources; determine an initial base model partition size based at least in part on the initial number of base model partitions, and evaluate the initial base model partition size at least in part with reference to at least one base model partition size reference. Predictive modeling tool 22 may further perform a process such as the one described above to determine a finalized number of base model partitions based at least in part on the initial base model partition size; determine a revised base model partition size; and generate revised base models based at least in part on the revised base model partition size. Generating the revised base models may include using predictive modeling framework 24, which may be a MapReduce framework, to randomly assign input data records from the plurality of data sources into the finalized number of base model partitions. In other examples, predictive modeling framework 24 may be implemented in other variations based on MapReduce or other forms of predictive modeling framework besides a MapReduce framework.

In a map stage, predictive modeling tool 22 may randomly assign each record one of k+2 keys 1, 2, . . . S+2. Predictive modeling tool 22 may randomly partition data, and assign data records into partitions randomly, taking advantage of facilities provided by predictive modeling framework 24 (e.g., a MapReduce framework) for easily shuffling or partitioning an incoming stream of big data into random partitions. For this example process, instead of using predictive modeling framework 24 to partition data by criteria such as data on income or education, predictive modeling framework 24 partition data to assure random distribution across representative partitions.

Figure 6:
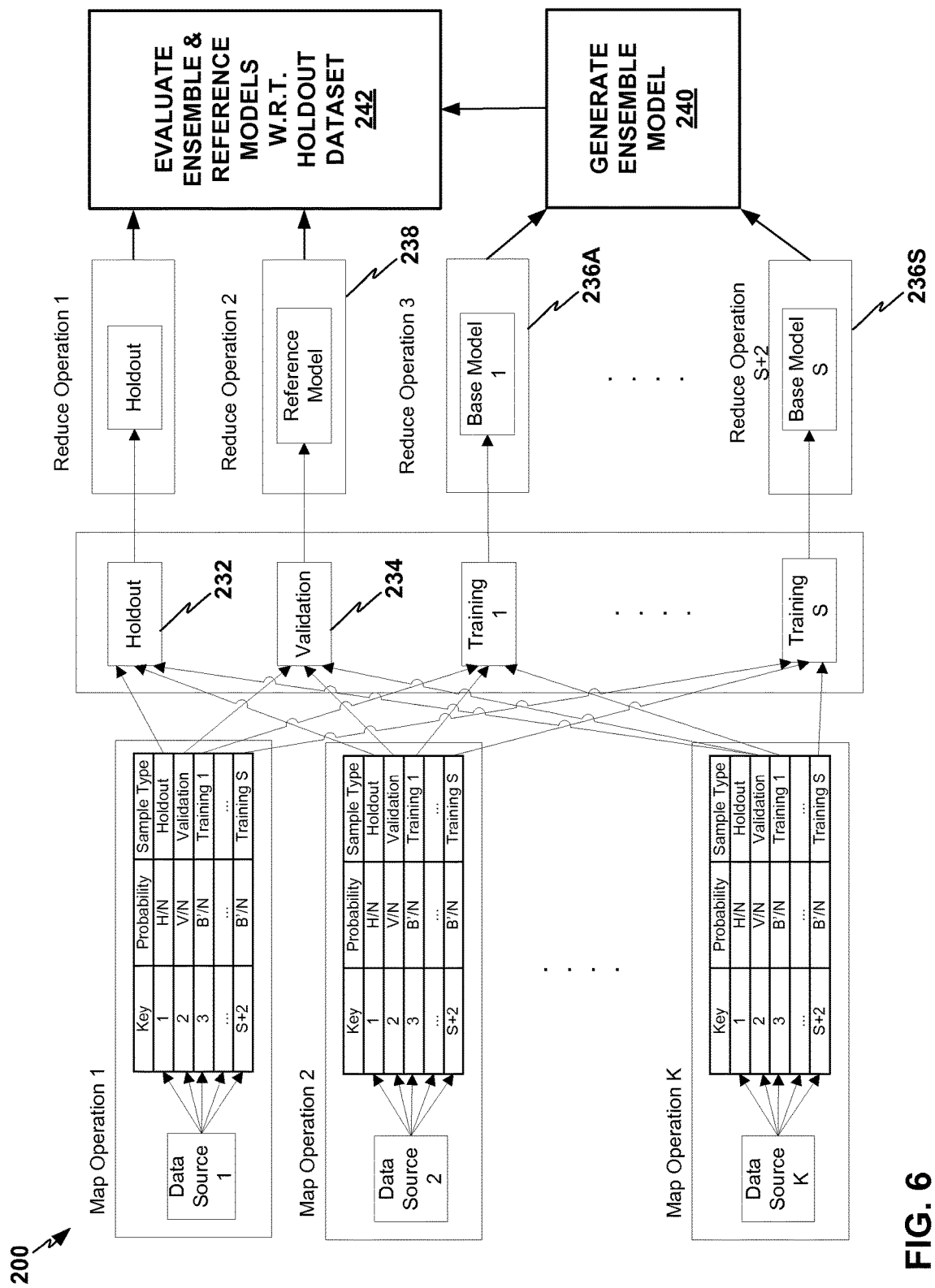
FIG. 6 depicts a conceptual diagram for a process that predictive modeling tool and/or predictive modeling framework may perform for processing data.

FIG. 6 depicts a conceptual diagram for a process 200 that predictive modeling tool 22 and/or predictive modeling framework 24 may perform for processing data. The diagram for process 200 shows the flow of input data through an arbitrary number K of mappers to the reducers where base and reference models are built. Regardless of the order and grouping of the input data, the expected sizes of the holdout, validation and base model training partitions may be as determined above, and predictive modeling tool 22 may randomly assign their contents to the various partitions.

Key values 1 and 2 may correspond to the holdout and validation samples, respectively. Thus, predictive modeling tool 22 may assign a given record key 1 with probability H/N, key 2 with probability V/N, and keys 3 . . . S+2 each with probability B'/N. The resulting value may be used as the map-reduce key. The key may also be written to mapper output records so that the reducers can distinguish partitions 1 and 2 from the base model partitions. The sizes of the resulting partitions may be approximately B', H and V.

In the reduce stage, predictive modeling tool 22 may generate models from each partition except the holdout sample 232. This may include generating reduced base models from the training sample base model partitions (236A, . . . 236S); a reference model (238) from the validation partition (234); and an ensemble model from the reduced base models (240). Predictive modeling tool 22 may then evaluate the ensemble model and the reference model with reference to the holdout dataset (242).

Figure 7:
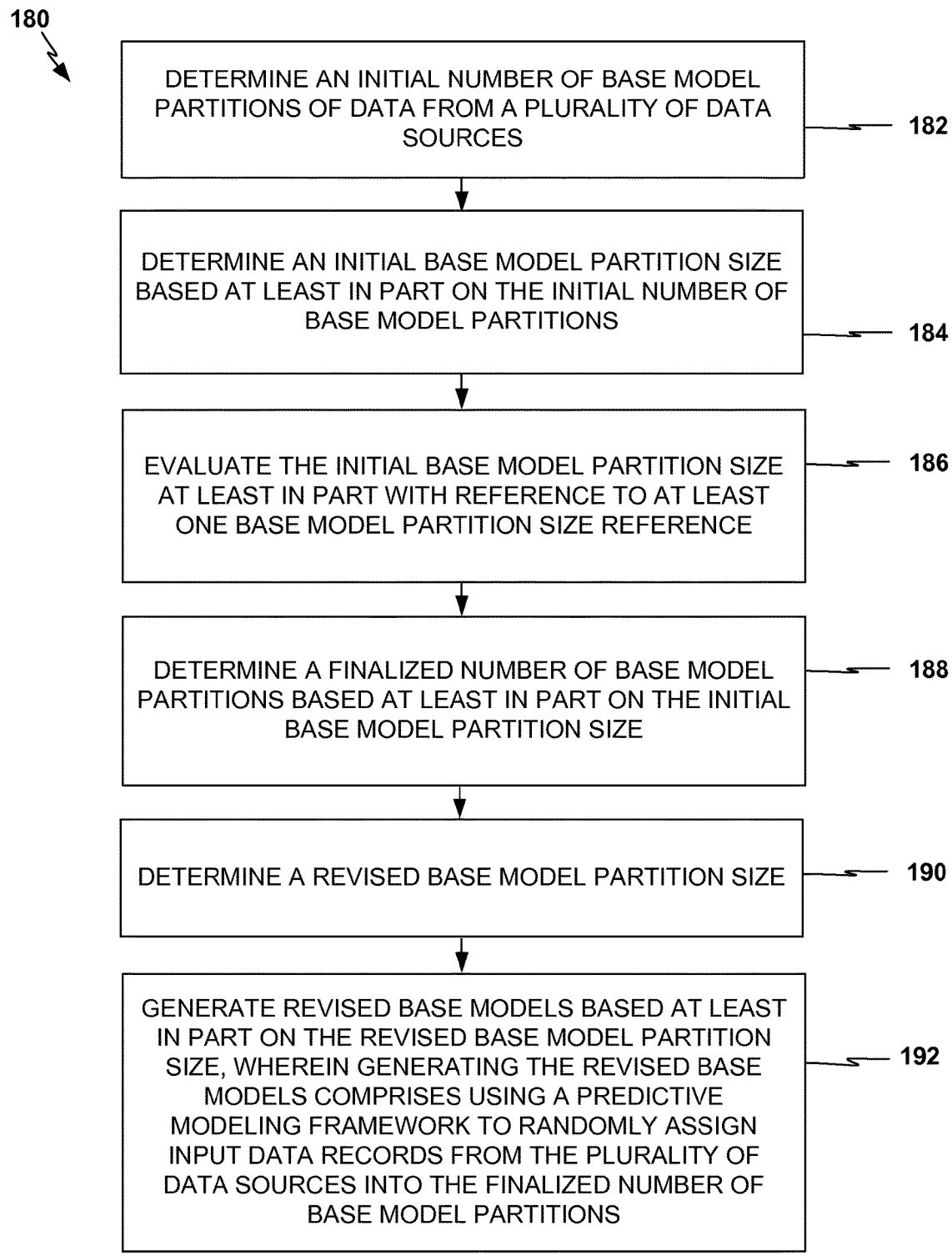
FIG. 7 shows a flowchart for an example overall process that predictive modeling tool, executing on one or more computing devices may perform analogous to those described above.

FIG. 7 shows a flowchart for an example overall process 180 that predictive modeling tool 22, executing on one or more computing devices (e.g., computing system 14), may perform, analogous to those described above. Predictive modeling tool 22 may determine an initial number of base model partitions of data from a plurality of data sources (182). Predictive modeling tool 22 may determine an initial base model partition size based at least in part on the initial number of base model partitions (184). Predictive modeling tool 22 may evaluate the initial base model partition size at least in part with reference to at least one base model partition size reference (186). Predictive modeling tool 22 may determine a finalized number of base model partitions based at least in part on the initial base model partition size (188). Predictive modeling tool 22 may determine a revised base model partition size (190). Predictive modeling tool 22 may generate revised base models based at least in part on the revised base model partition size, wherein generating the revised base models comprises using a predictive modeling framework to randomly assign input data records from the plurality of data sources into the finalized number of base model partitions (192).

Figure 8:
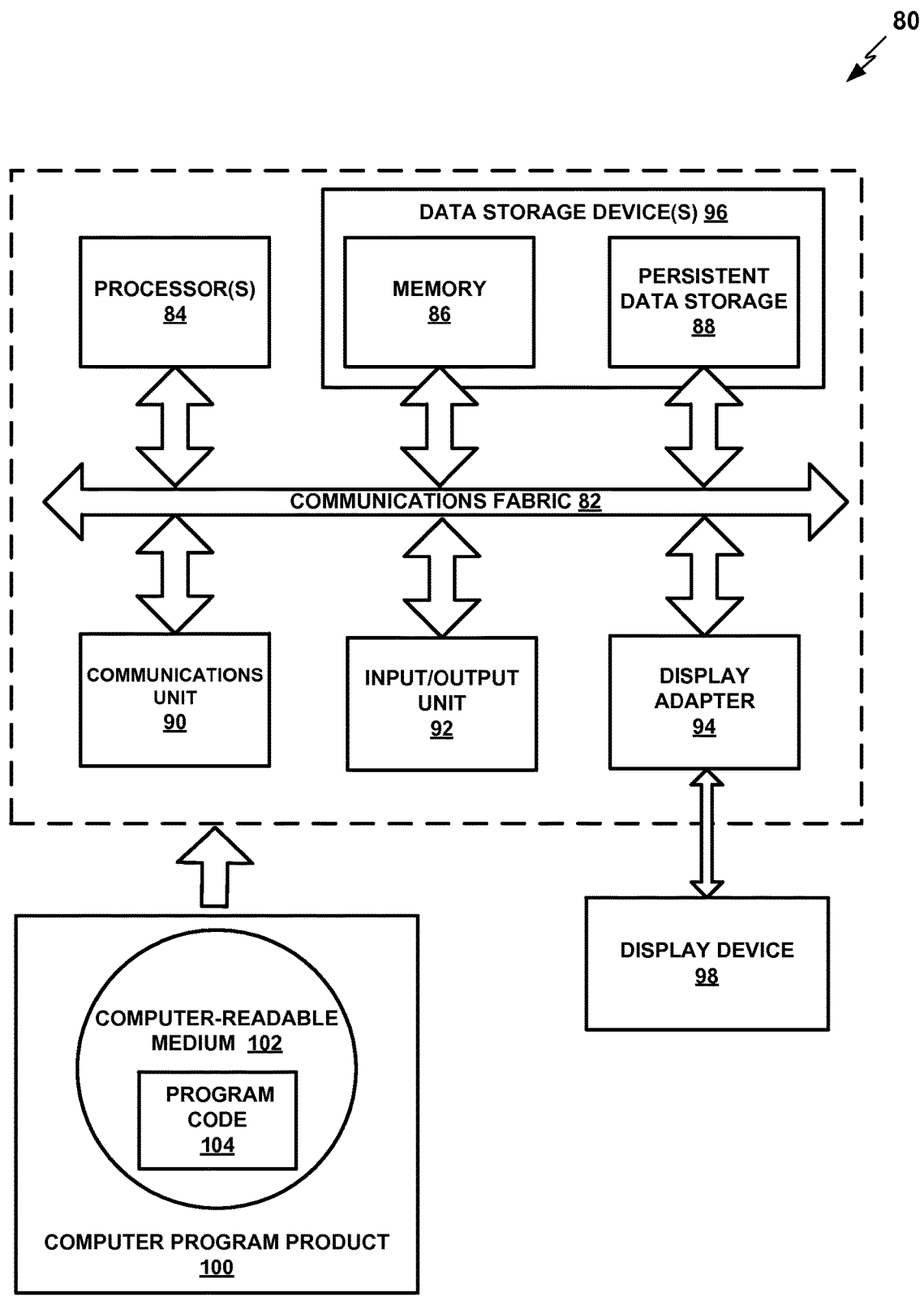
FIG. 8 is a block diagram of a computing device that may be used to execute a predictive modeling tool, according to an illustrative example.

FIG. 8 is a block diagram of a computing device 80 that may be used to execute a predictive modeling tool 22, according to an illustrative example. Computing device 80 of FIG. 8 may be an implementation of computing device 14 as depicted in FIG. 1. Computing device 80 may also be any server for providing or executing a predictive modeling tool, application, or framework in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 8, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a predictive modeling tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining a candidate adjustment factor for a number of base model partitions of data from a plurality of data sources based at least in part on a target size of an ensemble model;
   determining an initial number of the base model partitions as a sum of a target size of the ensemble model and the lower of either the candidate adjustment factor or a constant;
   determining an initial base model partition size based at least in part on the initial number of base model partitions;
   evaluating the initial base model partition size at least in part with reference to at least one base model partition size reference;
   determining a finalized number of base model partitions based at least in part on the evaluating of the initial base model partition size at least in part with reference to the at least one base model partition size reference;
   determining a revised base model partition size based at least in part on the finalized number of base model partitions; and
   generating revised base models based at least in part on the revised base model partition size, wherein generating the revised base models comprises using a predictive modeling framework to randomly assign input data records from the plurality of data sources into the finalized number of base model partitions.

2. The method of claim 1, wherein the predictive modeling framework comprises a MapReduce framework.

3. The method of claim 1, wherein using the predictive modeling framework to randomly assign the input data records from the plurality of data sources into the finalized number of base model partitions comprises using the MapReduce framework to randomly assign the input data records from the plurality of data sources into the finalized number of base model partitions.

4. The method of claim 1, further comprising determining the initial base model partition size by determining a floor of a total number of records in a dataset, minus a size of a holdout sample and a size of a validation sample V, then divided by a number of base partitions.

5. The method of claim 1, wherein the initial number of base model partitions comprises an estimated target number of base model partitions, the method further comprising determining the initial base model partition size based also at least in part on a minimum number of base model partitions.

6. The method of claim 1, further comprising generating an output based at least in part on the revised base model partition size.

7. The method of claim 1, further comprising:
   generating, using reduce operations, the plurality of base model partitions based on the plurality of training samples, prior to determining an initial number of base model partitions of data from a plurality of data sources.

8. The method of claim 1, further comprising generating an ensemble model based on the plurality of revised base models.

9. The method of claim 6, further comprising:
   generating, using map operations for each of the data sources, a validation sample and a holdout sample from the data sources;
   merging the holdout samples into a holdout dataset; and
   generating, using a reduce operation, a reference model based on the validation samples.

10. The method of claim 9, further comprising evaluating the ensemble model and the reference model with reference to the holdout dataset.

11. The method of claim 10, further comprising generating a predictive model based at least in part on the evaluating of the ensemble model and the reference model with reference to the holdout dataset.

* * * * *